Nov. 17, 1931.   B. A. PLIMPTON   1,832,240
INSULATOR PIN AND METHOD OF MAKING SAME
Filed Oct. 11, 1927
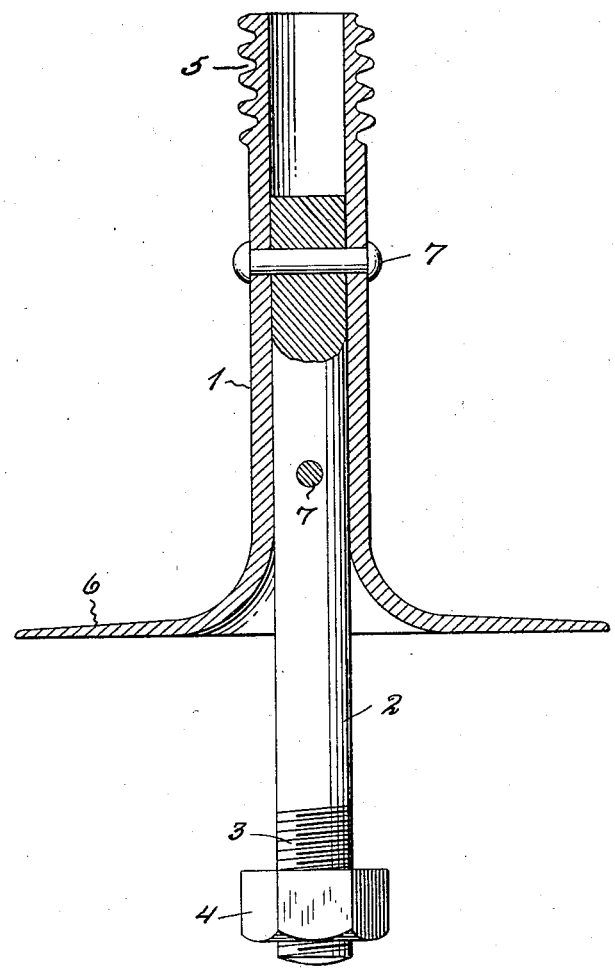
Inventor
Bentley A. Plimpton
By
his Attorney Patented Nov. 17, 1931

1,832,240

UNITED STATES PATENT OFFICE

BENTLEY A. PLIMPTON, OF BALTIMORE, MARYLAND, ASSIGNOR TO LOCKE INSULATOR CORPORATION, OF BALTIMORE, MARYLAND, A CORPORATION OF MARYLAND

INSULATOR PIN AND METHOD OF MAKING SAME

Application filed October 11, 1927. Serial No. 225,506.

The invention relates to the general class of insulator supports and has special reference to insulator supporting pins adapted to be mounted upon cross arms or the like.

The principal object of the invention, generally stated, is to provide a pin and a novel method of making the same whereby the cost of production will be reduced to the minimum.

An important object of the invention is to provide an insulator supporting pin in which the entire portion located above the cross arm or other support will be in one piece, there being no joints through which water might enter and cause rusting with resultant deterioration.

Another object of the invention is to provide a method of making a pin which has its major portion formed from a single piece of piping or tubing of suitable metal having one end formed with rolled threads for threaded engagement within an insulator or thimble secured therein, the other end being spun or otherwise drawn out to form the base flange adapted to seat upon a cross arm or the like.

An additional object of the invention is to provide a pin of this character which may have its securing bolt portion of any desired length and which will moreover be simple and inexpensive to manufacture, easy to apply and use, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawing in which:

The figure is a vertical longitudinal sectional view through an insulator pin constructed in accordance with my invention.

Referring to the drawing in detail, I have shown the supporting pin as comprising two main parts 1 and 2, the former being of special construction to be described and the latter conveniently consisting of a suitable length of rod having a threaded end 3 carrying a nut 4 for securing purposes.

The main or body member 1 may in actual practice be most conveniently formed from a single length of metal pipe or tubing having one end formed with a preferably rolled thread 5 adapted to be screwed into an insulator or into the metallic thimble commonly provided therein. The other end of the member 1 is provided with a seat portion 6 adapted to engage upon the top of a cross arm or other support. In actual practice, the pipe or tube from which the member 1 is made may be spun, drawn out, pressed or otherwise treated to define the flange or seat 6 which is here represented as gradually decreasing in thickness toward its outer edge, this decrease resulting from the spinning or drawing out treatment.

The bolt or rod member 2 is telescoped within the body member 1 and is secured thereto in any desired manner as for instance by means of any suitable number of rivets 7 or their equivalent passed transversely through the rod member and body member 1. The bolt or rod member 2 may of course be of any desired length depending upon the thickness of the cross arm or other support upon which the device is intended to be mounted.

The support is used in the ordinary manner, the bolt or rod 2 being inserted through the cross arm and the nut 4 being then applied and tightened to effect the necessary securing action. The insulator itself, not shown, may be mounted upon the pin either before or after the latter is fastened to the cross arm, this detail being immaterial.

From the foregoing description and a study of the drawing it will be apparent that I have thus provided a very simply constructed and inexpensive pin for the purpose specified and one which has the advantage of being free from any joints above the cross arm or equivalent support, the absence of joints precluding the possibility of entrance of water with consequent rusting and deterioration. The particular method set forth in regard to the formation of the body from a single length of pipe or tubing is important inasmuch as the cost of production will be greatly reduced. Of course the pin is galvanized or otherwise treated to render it at least substantially weather proof as is the customary practice.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. An insulator supporting pin comprising a one piece forged body member of tubular form having one end spun to provide an outstanding circular flange adapted to form a seat for engagement upon the top of a cross arm or other equivalent support, the other end having a rolled thread for engagement within an insulator, a securing bolt mounted within the body and having a threaded end provided with a nut, and transverse rivets passing through the bolt and the body member.

2. A supporting pin of the character described comprising a tubular body member having one end formed with a rolled thread and having its other end formed with an integral outstanding flange merging gradually into the exterior of the body member, said flange decreasing in thickness toward its outer edge, and a securing bolt mounted in telescoped relation snugly within the body and substantially filling the interior thereof and projecting beyond said flange, said projecting portion being threaded and carrying a securing nut.

3. An insulator supporting pin comprising a one piece seamless forged body member of tubular form having one end spun to provide an outstanding circular flange adapted to form a seat for engagement upon the top of a support, the other end being rolled to provide a thread for engagement within an insulator, a bolt fitting snugly within the body and extending substantially throughout the length thereof and projecting beyond said flange.

In testimony whereof I affix my signature.

BENTLEY A. PLIMPTON.